US008117448B2

(12) United States Patent
Takemura et al.

(10) Patent No.: US 8,117,448 B2
(45) Date of Patent: Feb. 14, 2012

(54) INFORMATION PROCESSING APPARATUS, INFORMATION PROCESSING METHOD, AND PROGRAM

(75) Inventors: Toshiharu Takemura, Tokyo (JP); Taro Kurita, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 1183 days.

(21) Appl. No.: 11/499,664

(22) Filed: Aug. 7, 2006

(65) Prior Publication Data

US 2007/0038864 A1    Feb. 15, 2007

(30) Foreign Application Priority Data

Aug. 15, 2005    (JP) ................................ 2005-235413

(51) Int. Cl.
*H04L 9/32* (2006.01)
(52) U.S. Cl. ...................................................... 713/169
(58) Field of Classification Search .................... 713/169
See application file for complete search history.

(56) References Cited

U.S. PATENT DOCUMENTS

| 5,293,029 | A | * | 3/1994 | Iijima | ............................ 235/380 |
| 5,355,413 | A | | 10/1994 | Ohno | |
| 6,567,915 | B1 | * | 5/2003 | Guthery | ......................... 713/168 |
| 7,526,625 | B2 | * | 4/2009 | Ebara et al. | ..................... 711/163 |
| 2001/0029579 | A1 | * | 10/2001 | Kusakabe et al. | ............. 713/172 |
| 2002/0040936 | A1 | * | 4/2002 | Wentker et al. | ................. 235/492 |
| 2007/0271433 | A1 | * | 11/2007 | Takemura | ...................... 711/164 |

FOREIGN PATENT DOCUMENTS

| EP | 0 262 025 A2 | 3/1988 |
| EP | 1 202 208 A1 | 5/2002 |
| WO | WO 01/77920 A1 | 10/2001 |

* cited by examiner

*Primary Examiner* — Peter Poltorak
(74) *Attorney, Agent, or Firm* — Oblon, Spivak, McClelland, Maier & Neustadt, L.L.P.

(57) ABSTRACT

An information processing apparatus includes a storage section that stores, for a management entity for which a memory area is to be formed, an authentication key and an encryption key. The information processing apparatus also includes a communication section that transmits an identifier of the authentication key, an identifier of the encryption key, and an area 0 key. The communication section receives, upon an authentication based on the authentication key and the area 0 key, data encrypted by the encryption key. The data indicates a size of the memory area. The area 0 key is stored in an area 0. The information processing apparatus further includes a forming section that forms the memory area starting from the area 0, based on the size of the memory area.

9 Claims, 10 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2005-235413 filed in the Japanese Patent Office on Aug. 15, 2005, the entire contents of which are incorporated herein by reference.

BACKGROUND OF THE INVENTION

1. Field of the Invention

The present invention relates to an information processing apparatus, an information processing method, and a program. More particularly, the present invention relates to an information processing apparatus for facilitating the use of IC chips, to an information processing method for use with the information processing apparatus, and to a program for use with the information processing method.

2. Description of the Related Art

In recent years, mobile phones, IC cards, and the like, in which a non-contact IC chip such as FeliCa™ is incorporated, have become popular. For example, a user can easily make a payment using electronic money by simply holding a cellular phone or the like up to a terminal (reader/writer) disposed in a shop.

Such processing (for example, a payment process using electronic money) in an IC chip is realized as a result of the following: a predetermined memory area of a memory in an IC chip is accessed and reading of data stored therein or writing of data thereinto is appropriately performed. The storage of the predetermined data and the formation of the memory area (hereinafter referred to as a "general system") where the data is stored are performed, for example, by an IC-chip-incorporated IC card issuer (operator providing services to be settled using electronic money).

Processing for configuring a general system will now be described with reference to a flowchart in FIG. 1 (refer to the ISO7816 standard). The configuration of the general system is realized, for example, by an IC-chip-incorporated IC card issuer by controlling an IC chip 11 via a control apparatus 12, as shown in FIG. 2.

A memory 21 in the IC chip 11 before the general system is configured, as shown in FIG. 3, is formed of one large memory area (hereinafter referred to as a "system 0"), and a memory area (hereinafter referred to as an "area 0") that is logically subordinate to the system 0.

In the system 0, a system 0 key assigned to the system 0, and definition information including the version information of the system 0 key are stored. In the area 0, an area 0 key assigned to the area 0, and definition information including the version information of the area 0 key are stored. The general system is configured in such a way that a portion of the area 0 of the system 0 is divided.

Referring back to FIG. 1, in step S1, the control apparatus 12 issues a command for specifying the IC chip 11. The specified IC chip 11 accesses the system 0 in the memory 21, and when the access is successful, the IC chip 11 notifies the control apparatus 12 of the successful access.

In step S2, the control apparatus 12 issues a command for obtaining the key version of each of the system 0 key of the system 0 of the memory 21 and the area 0 key of the area 0 provided directly below the system 0 in the IC chip 11. The IC chip 11 reads the key version of the system 0 key from the definition information of the system 0, also reads the key version of the area 0 key from the definition information of the area 0 provided directly below the system 0, and returns them to the control apparatus 12.

In step S3, the control apparatus 12 performs mutual authentication for configuring a general system with the IC chip 11 by using the system 0 key and the area 0 key. The control apparatus 12 holds the system 0 key and the area 0 key of predetermined versions. When the key version of the held key corresponds to the key version obtained in step S2, the control apparatus 12 can perform mutual authentication with the IC chip 11 by using the system 0 key and the area 0 key.

When the mutual authentication in step S3 is successful, in step S4, the control apparatus 12 issues, to the IC chip 11, a command for configuring a general system starting from the area 0 of the system 0. This command contains data indicating the size of the general system to be divided, which is encrypted using predetermined encryption keys generated on the basis of the system 0 key and the area 0 key, the general system key assigned to the general system, and the area 0 key assigned to the area 0 formed directly below the general system.

When the IC chip 11 receives the command for configuring the general system from the control apparatus 12, the IC chip 11 decodes the data contained in the command by using the predetermined encryption keys generated on the basis of the system 0 key and the area key 0. Also, the IC chip 11, as shown in FIG. 4, logically divides the general system starting from the portion of the area 0 of the system 0, and stores, in the general system (memory area), the general system key obtained as a result of the decoding, definition information containing the version information of the general system key, the area 0 key of the area 0 of the general system, and definition information containing the version information of the area 0 key.

Access to the configured general system (and the area 0) is authenticated by the general system key of the general system and the area 0 key thereof. Transmission or reception of data with respect to the area 0 of the general system is performed in such a way that the data is encrypted using the encryption keys generated on the basis of the general system key and the area 0 key of the general system.

SUMMARY OF THE INVENTION

However, as described above, when the mutual authentication is performed using the system 0 key and the area 0 key (step S3) and information necessary for division is encrypted using those keys and transmitted or received (step S4), when an operator configuring the general system does not have the system 0 key and the area 0 key thereof unlike the owner of the system 0, there are cases in which it is difficult to configure the general system.

That is, in the related art, when the operator configuring the general system differs from the owner of the system 0 in the manner described above, there are cases in which it is difficult to configure the general system, with the result that the utilization of IC cards is limited.

The present invention has been made in view of such circumstances. It is desirable that a general system is capable of being configured even when an operator configuring the general system is not an owner of the system 0.

According to an embodiment of the present invention, there is provided an information processing apparatus for performing processing on the basis of data stored in a predetermined memory area, the information processing apparatus including: means for storing, for each management entity for which a memory area is to be formed, an authentication key and an encryption key, the authentication key being necessary for authentication when the memory area is formed, and the encryption key being for encrypting information which is transmitted or received when the memory area is formed; means for authenticating the forming of the memory area on the basis of the authentication key; communication means for transmitting or receiving data encrypted using the encryption key; and means for forming the memory area on the basis of data transmitted or received by the communication means.

The authentication means may perform mutual authentication with a control apparatus for requesting the formation of the memory area by using the authentication key, and the communication means may receive data that has been transmitted from the control apparatus and that has been encrypted by the encryption key.

According to another embodiment of the present invention, there is provided an information processing method including the steps of: authenticating forming of a memory area to be stored in a memory section on the basis of an authentication key necessary for authentication when the memory area is formed; transmitting or receiving data encrypted using an encryption key for encrypting information transmitted or received when the memory area is formed; and forming the memory area on the basis of the data transmitted or received in the step of the transmitting or receiving.

According to another embodiment of the present invention, there is provided a program including the steps of: authenticating forming of a memory area to be stored in a memory section on the basis of an authentication key necessary for authentication when the memory area is formed transmitting or receiving data encrypted using an encryption key for encrypting information transmitted or received when the memory area is formed; and forming the memory area on the basis of the data transmitted or received in the step of the transmitting or receiving in the step of the transmitting or receiving.

In the information processing apparatus, the information processing method, and the program according to the embodiments of the present invention, an authentication key for authentication necessary when a predetermined memory area where data necessary for processing is to be stored is to be formed, and an encryption key for encrypting information transmitted or received when the memory area is formed are stored for each management entity for which a memory area is formed, the formation of the memory area is authenticated on the basis of the authentication key, data encrypted using the encryption key is transmitted or received, and the memory area is formed on the basis of the transmitted or received data.

As described above, according to an embodiment of the present invention, even if, for example, a system 0 key is not possessed, a general system can be configured.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 5:
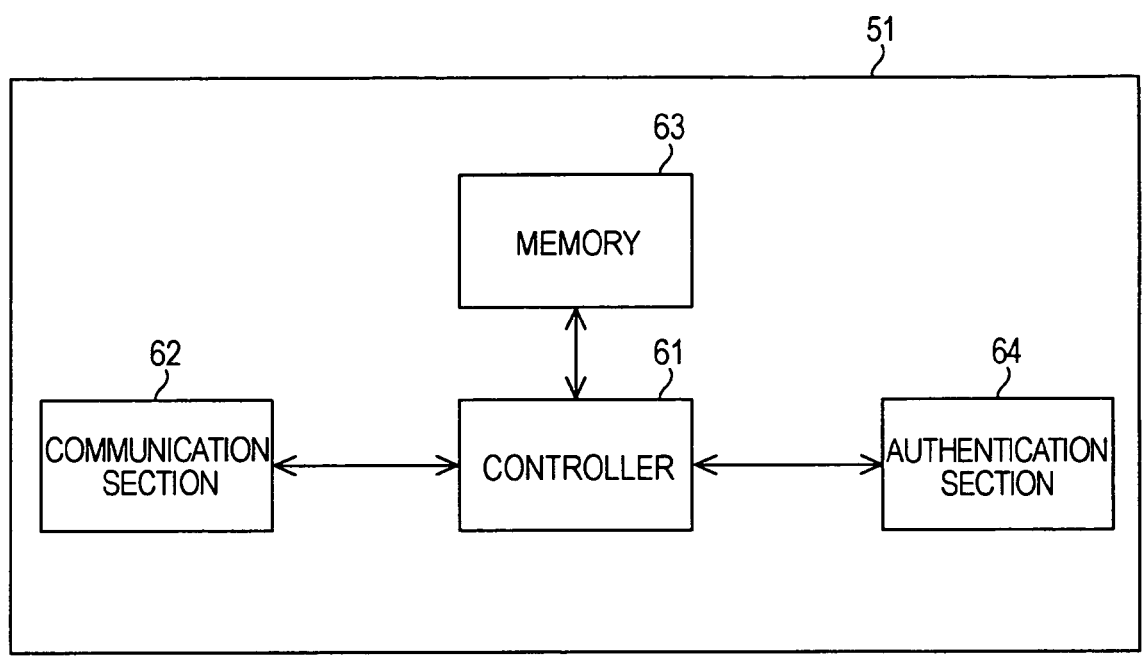
FIG. 5 is a block diagram showing an example of the configuration of an IC chip 51 to which an embodiment of the present invention is applied.

An information processing apparatus according to an embodiment of the present invention includes means (for example, a management system 71 of FIG. 10) for storing, for each management entity for which a memory area is to be formed, an authentication key (for example, an authorization key of FIG. 10) and an encryption key, the authentication key being necessary for authentication when the memory area (for example, a general system 71 of FIG. 10) is formed, and the encryption key (for example, a package key of FIG. 10) being for encrypting information which is transmitted or received when the memory area is formed; means (for example, an authentication section 64 of FIG. 5) for authenticating the forming of the memory area on the basis of the authentication key; communication means (for example, an RF (Radio Frequency) section 62 of FIG. 5) for transmitting or receiving data encrypted using the encryption key; and means (for example, a controller 61 of FIG. 5) for forming the memory area on the basis of data transmitted or received by the communication means.

An information processing method and a program according to embodiments of the present invention include the steps of authenticating (for example, step S13 of FIG. 8) forming of a memory area to be stored in a memory section on the basis of an authentication key necessary for authentication when the memory area is formed; transmitting or receiving (for example, step S14 of FIG. 8) data encrypted using an encryption key for encrypting information transmitted or received when the memory area is formed; and forming (for example, step S14 of FIG. 8) the memory area on the basis of the data transmitted or received in the step of the transmitting or receiving.

FIG. 5 shows an example of the configuration of an IC chip 51 to which an embodiment of the present invention is applied. The IC chip 51 is used in such a manner that it is incorporated in, for example, an IC card, a mobile phone, or the like.

A communication section 62 performs wireless communication to and from a reader/writer (not shown) via an antenna (not shown), and communicates with a control apparatus 52 (to be described later).

In a memory 63, a general system is configured as will be described later, and in the configured general system (memory area), information necessary for performing predetermined processing is stored.

Figure 1:
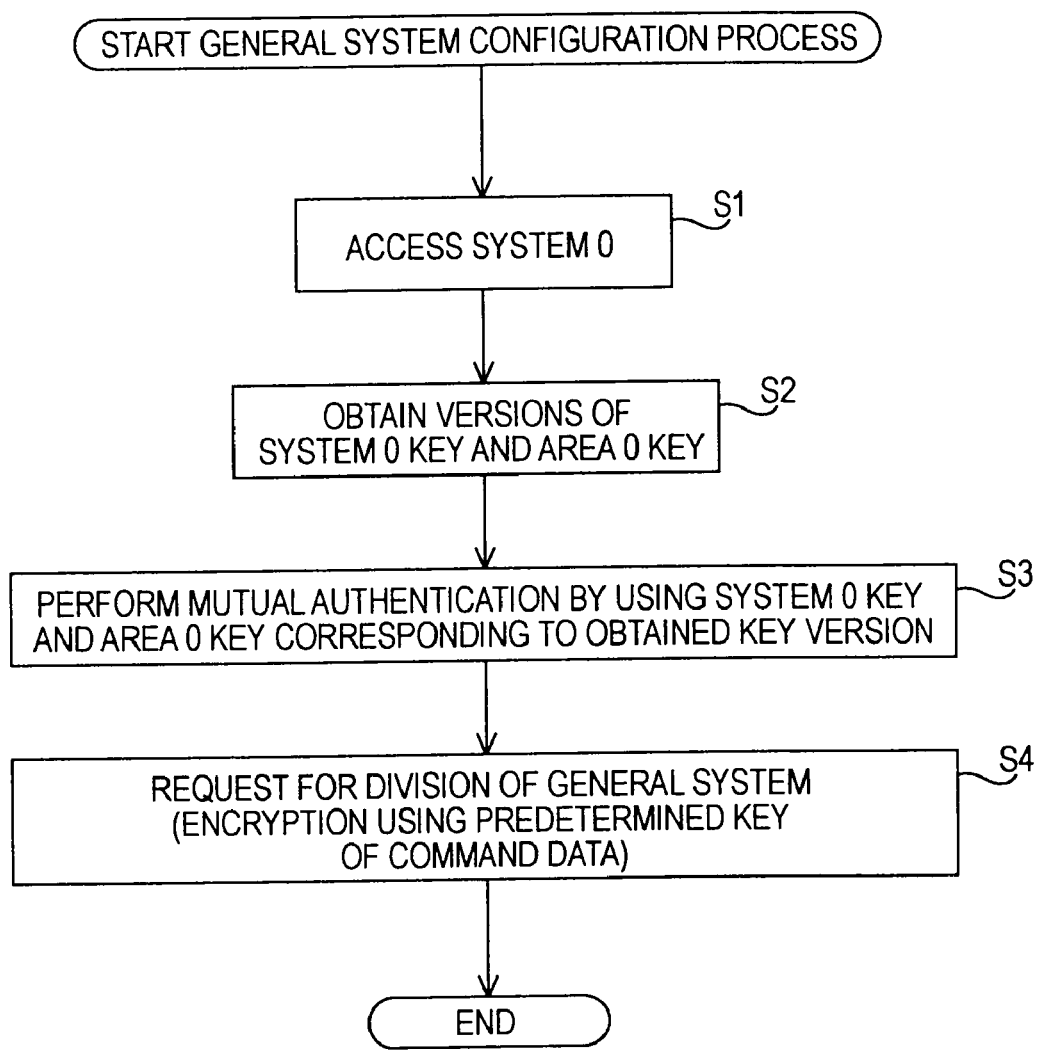
FIG. 1 is a flowchart illustrating a general system configuration process according to the related art.
Figure 2:
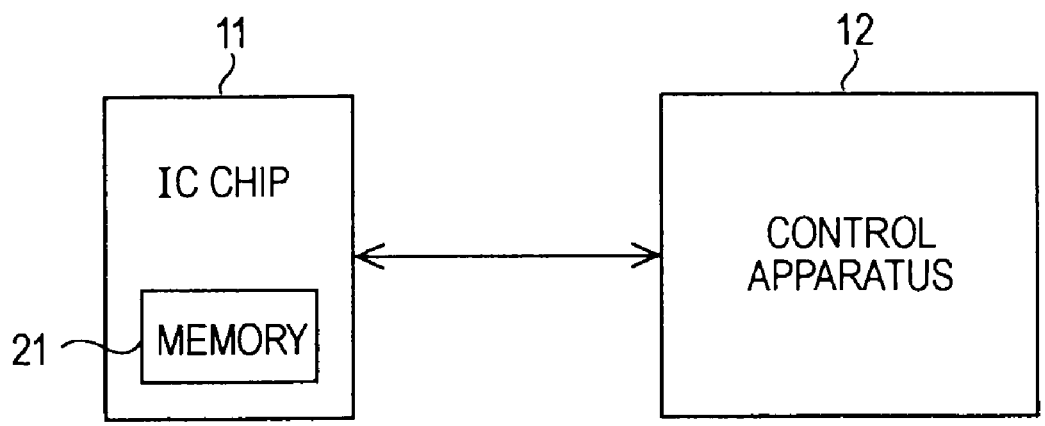
FIG. 2 illustrates a general system configuration process according to the related art.
Figure 3:
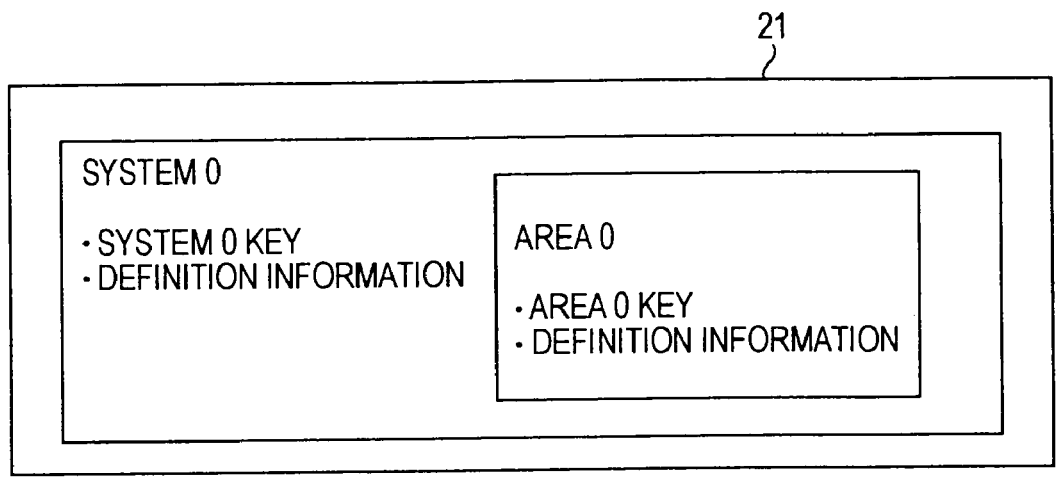
FIG. 3 shows an initial status of a memory 21 of an IC chip 11 of FIG. 2.
Figure 4:
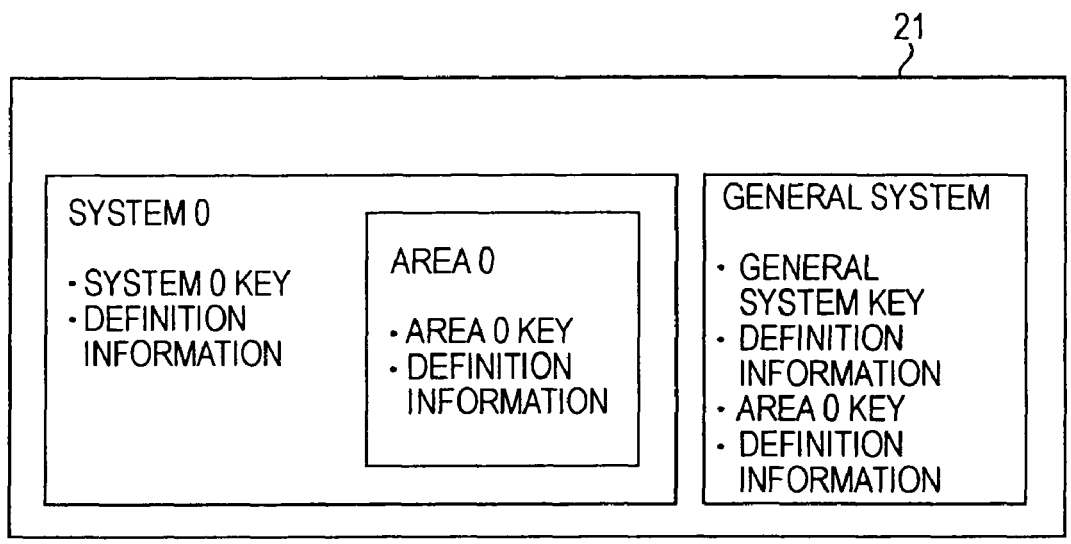
FIG. 4 shows a general system configured in the IC chip 11.
Figure 6:
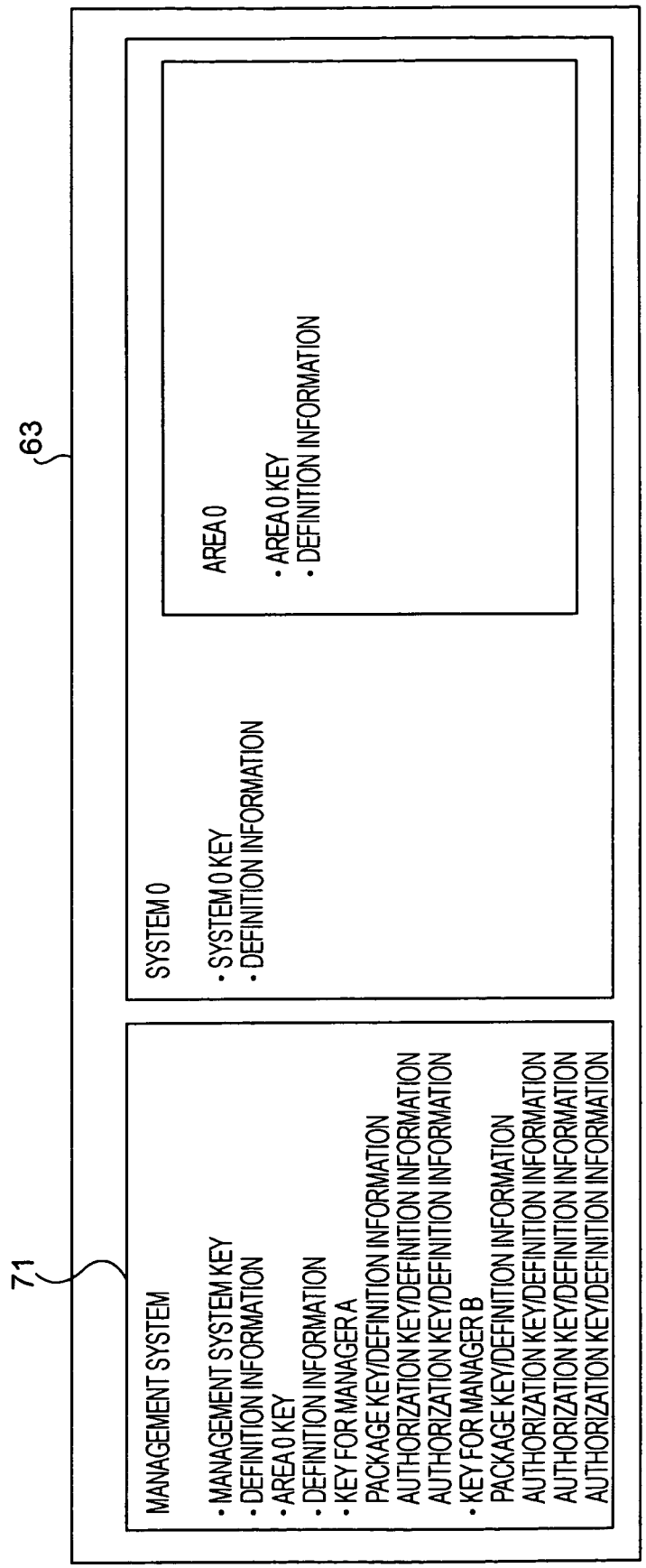
FIG. 6 shows an initial status of a memory 63 of the IC chip 51 of FIG. 5.

FIG. 6 shows an example of the data structure of the memory 63 in the initial status (before the general system is configured). In the memory 63 in the initial status, similarly to the case in FIG. 3, a system 0 and an area 0 are provided, and also, a memory area called a management system 71 is further provided.

In the management system 71, the management system key of the management system 71, definition information containing the version information thereof, the area 0 key of the area 0 provided directly below the management system 71, and definition information containing the version information thereof are stored. Furthermore, as management entity keys for the management entity who manages the IC chip 51, such as an IC chip manufacturer and an IC card issuer, a package key and an authorization key for each management entity are stored in the management system 71.

Authorization keys are assigned in accordance with the number of functions that the management entity is authorized to use, and authentication is performed using this key. A package key is assigned individually for each management entity, and information necessary when a general system is to be configured is encrypted using this key.

In the example of FIG. 6, a package key and authorization keys are provided for each of a management entity A (for example, an IC card issuer) and a management entity B (for example, an IC chip manufacturer (owner of the system 0)). Two authorization keys are assigned to the management entity A, and three authorization keys are assigned to the management entity B.

Figure 7:
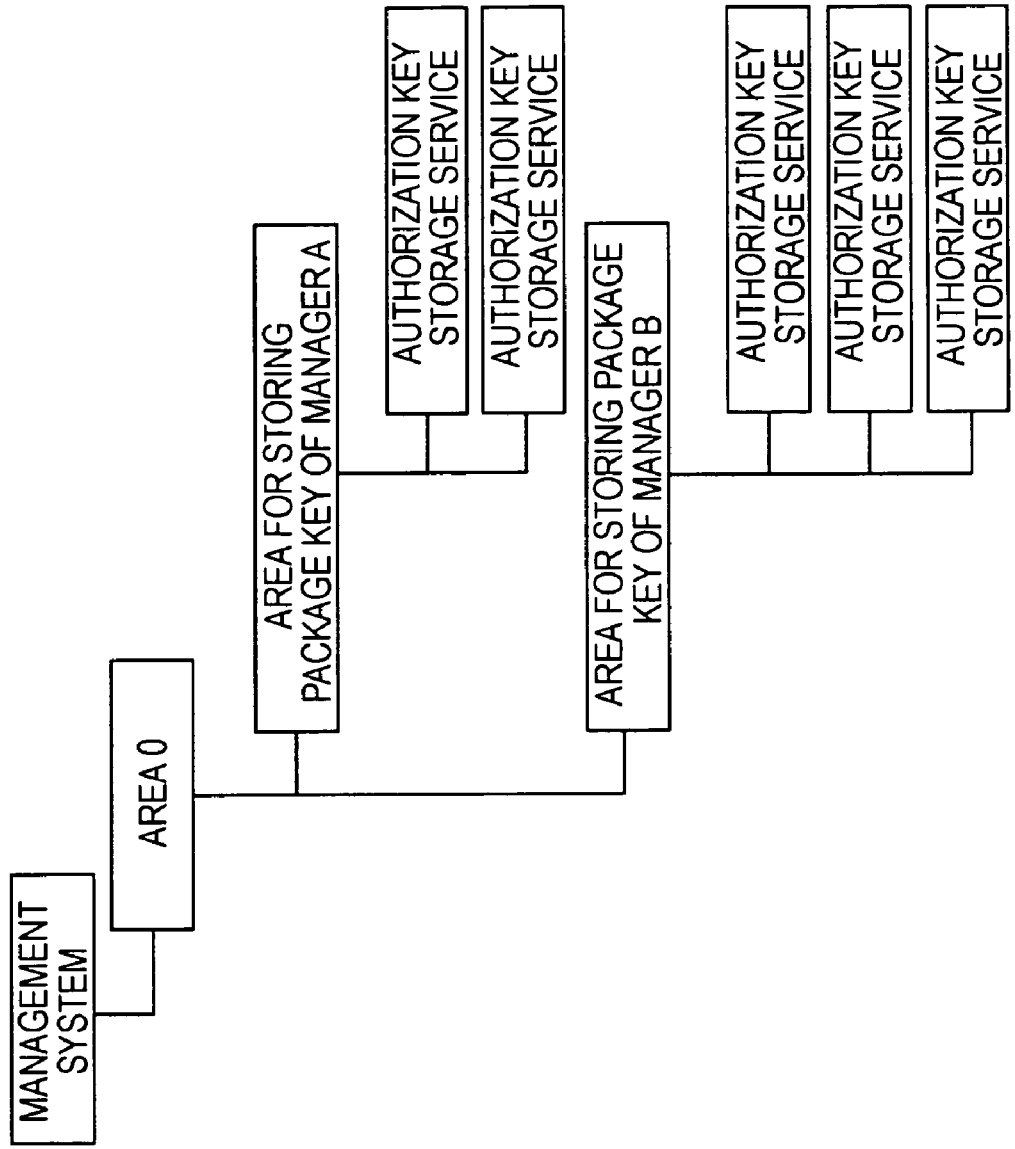
FIG. 7 shows the structure of data stored in a management system 71 of FIG. 6.

These pieces of information stored in the management system 71 are stored so as to logically form a hierarchical structure, as shown in FIG. 7.

Predetermined processing (for example, a payment process using electronic money) to be performed in the IC chip 51 is realized as a result of appropriately performing a processing operation (hereinafter referred to as "services") for accessing a memory area in units of blocks in which data necessary for processing is stored. For this purpose, it is necessary to register services. When a plurality of services exist, the services are registered in a hierarchical manner so that services to be performed for a series of transactions can be efficiently performed.

That is, as shown in FIG. 7, as a result of forming a hierarchical structure also for access to each piece of information in the management system 71 and registering the access in the same manner as for normal services, services related to the formation of the general system can be performed similarly to that for normal services.

Referring back to FIG. 5, the authentication section 64 authenticates access to the management system 71, the system 0, the area 0, the general system formed as will be described later, and the like.

The controller 61 controls each section.

Figure 8:
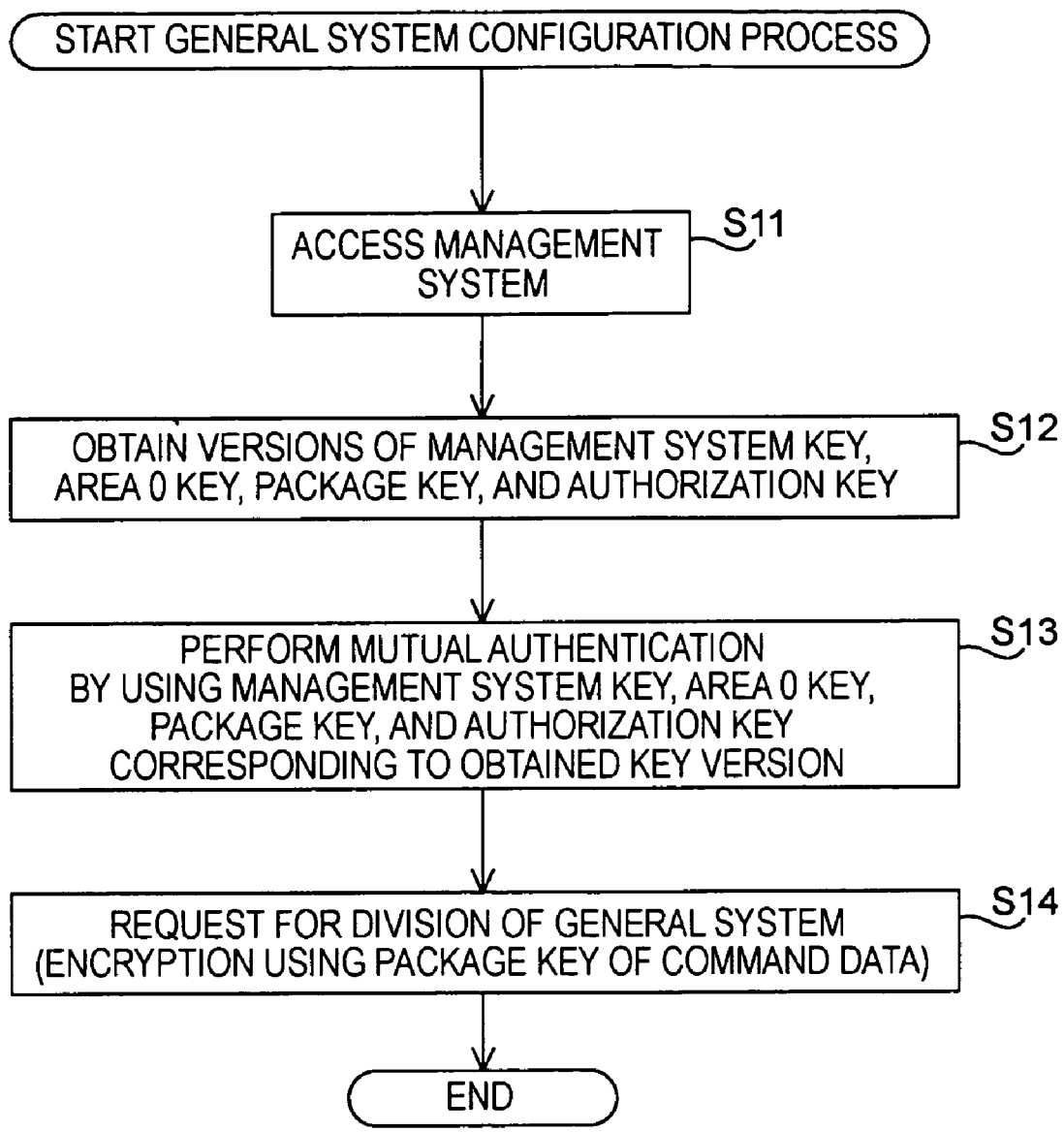
FIG. 8 is a flowchart illustrating a general system configuration process according to an embodiment of the present invention.
Figure 9:
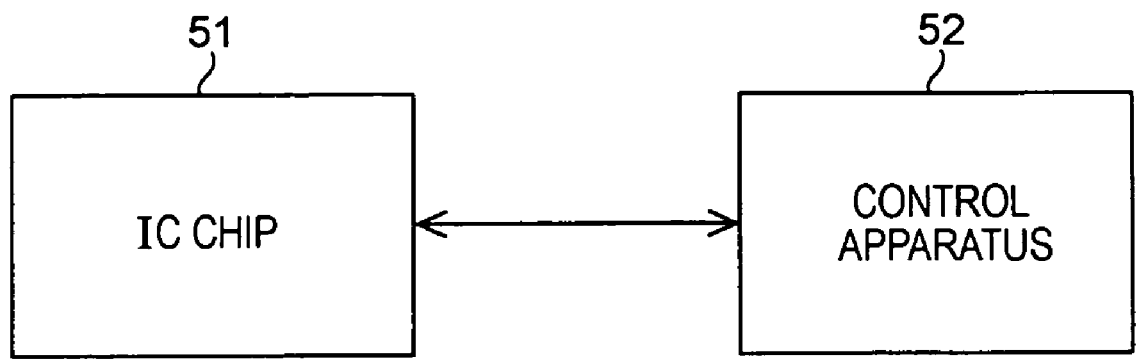
FIG. 9 illustrates a general system configuration process according to an embodiment of the present invention.

Next, a description will be given, with reference to a flowchart in FIG. 8, of a general system configuration process according to an embodiment of the present invention. The configuration of the general system is performed under the authorization of a management entity (for example, an issuer that issues an IC card in which the IC chip 51 is incorporated. As shown in FIG. 9, the configuration of the general system is realized by the management entity controlling the IC chip 51 via the control apparatus 52.

In step S11, the control apparatus 52 issues a command for specifying the IC chip 51. The IC chip 51 accesses the management system 71 of the memory 63, and when the access is successful, the IC chip 51 notifies the control apparatus 52 of the successful access.

In step S12, the control apparatus 52 issues a command for obtaining the key version of each of the management system key of the management system 71, the area 0 key of the area 0, the package key for the management entity A, and one authorization key for the management entity A.

The IC chip 51 reads the key version of the management system key from the definition information of the management system 71, and also reads the key version of the area 0 key from the definition information of the area 0 provided directly below the management system 71.

Also, the IC chip 51 reads the key version of the package key from the definition information of the package key for the management entity A, which is stored in the management system 71, and also reads the key version of the authorization key from the definition information of one authorization key for the management entity A.

The IC chip 51 returns, to the control apparatus 52, the key version of each of the read management system key, the area 0 key, the package key, and the authorization key.

In step S13, the control apparatus 52 performs mutual authentication with the IC chip 51 by using the management system key, the area 0 key, and the authorization key. The control apparatus 52 holds the management system key and the area 0 key of a predetermined version, and the authorization key for the management entity A. When these key versions correspond to the key version obtained in step S12, it is possible to perform mutual authentication with the IC chip 51.

In step S14, the control apparatus 52 issues a command for configuring a general system starting from the area 0 of the system 0. This command contains data indicating the size of the area to be divided, which is encrypted using the package key of the key version corresponding to the key version obtained in step S12, the general system key, and the area 0 key of the area 0 of the general system.

Figure 10:
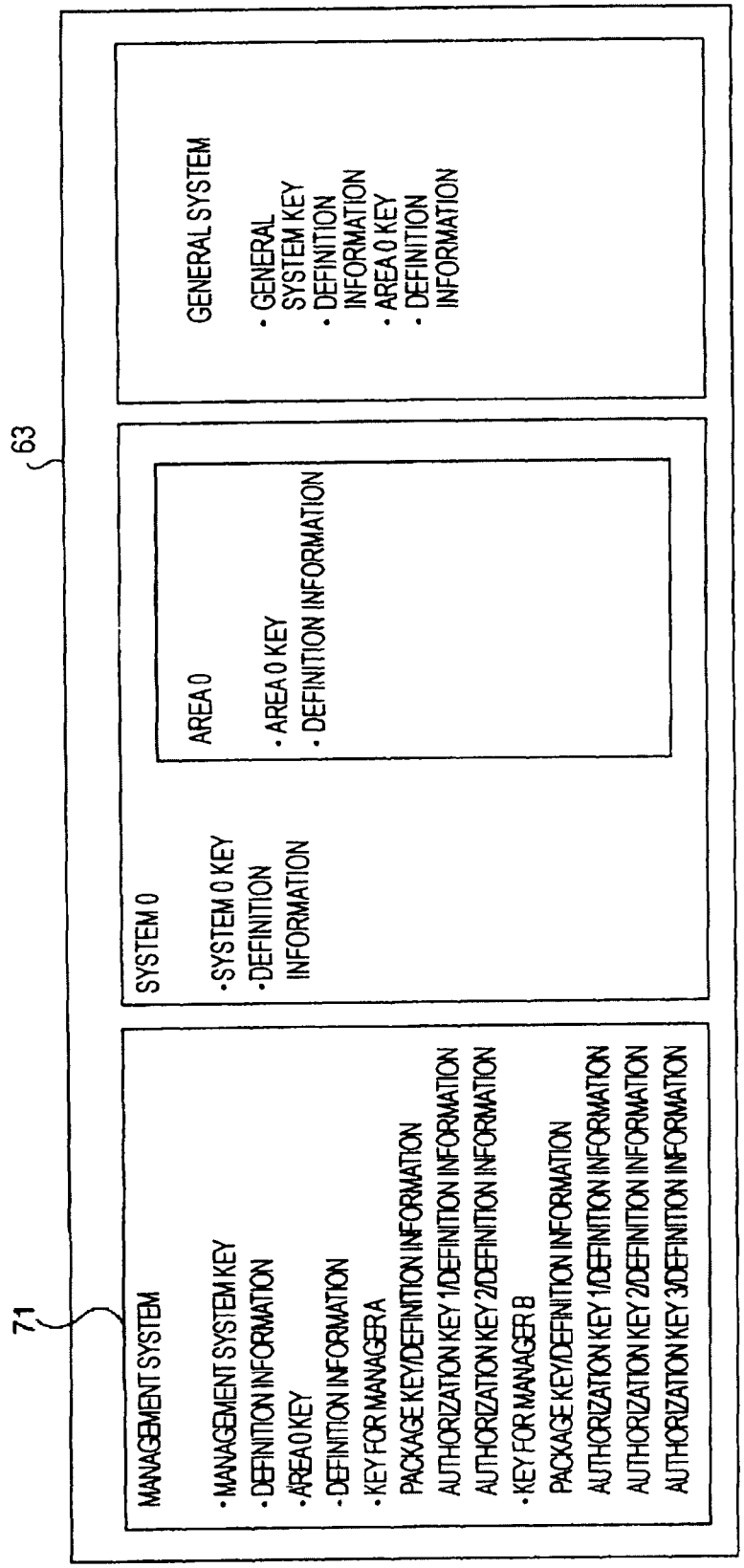
FIG. 10 shows a general system configured in the IC chip 51.

When the IC chip 51 receives a command for configuring a general system from the control apparatus 52, the IC chip 51 decodes the data contained in the command by using the package key, logically divides the general system starting from the portion of the area 0 of the system 0 as shown in FIG. 10, and stores, in the general system (memory area), the general system key obtained as a result of the decoding, definition information containing the version information of the general system key, the area 0 key of the area 0 of the general system, and definition information containing the version information of the area 0 key.

In the manner described above, the general system is divided into areas starting from the area 0 of the system 0.

That is, in the related art, when the general system is to be divided into areas, mutual authentication with the IC chip is performed by using the system 0 key and the area 0 key thereof, and information necessary for the division is encrypted using those keys and transmitted or received. According to an embodiment of the present invention, as described above, authentication is performed using the authorization key for each management entity, and encryption is performed using the package key for each management entity. Therefore, even if the operator configuring the general system differs from the owner of the system 0, the general system can be configured.

In this specification, the "information processing apparatus" refers to an IC chip for performing at least non-contact IC card functions; an IC chip for performing non-contact IC card functions and reader/writer functions; a non-contact IC card function execution section in which an IC chip serving as a wireless communication section and a non-contact IC card function execution section is incorporated; a non-contact IC card in which a wireless communication section and an IC chip for performing reader/writer functions are incorporated; an IC card, such as an SIM (Subscriber Identity Module) and a UIM (User Identification Module) card, in which a non-contact IC card function execution section is incorporated; a contact IC card having a terminal on the surface thereof; an IC chip having functions identical to those of a contact/non-contact IC card; or an information communication terminal apparatus, such as a PHS (Personal Handyphone System) or a PDA (Personal Digital Assistant), in which one of these IC chips or IC cards is incorporated.

In the foregoing, a case in which an issuer that issues IC cards configures a general system by using the key for the management entity A has been described as an example. It is also possible for the IC chip manufacturer to configure the general system by using the package key and the authorization key for the management entity B in the above-described manner.

The series of processes described above can be carried out not only by hardware but also by software. When the series of processes is to be carried out by software, a program constituting the software is installed from a program recording medium into a computer that is incorporated in specialized hardware, or into, for example, a general-purpose personal computer that can perform various functions by having various programs installed therein.

In this specification, the steps describing the program stored on the program recording medium include not only processes carried out in time series in the described order but also processes carried out in parallel or individually and not necessarily in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   means for storing, for a management entity for which a memory area is to be formed, an authentication key and an encryption key;
   communication means for transmitting an identifier of the authentication key, an identifier of the encryption key, and an area 0 key, and for receiving, upon an authentication based on the authentication key and the area 0 key, data encrypted by the encryption key, the data indicating a size of the memory area, the area 0 key stored in an area 0;
   authentication means for authenticating a forming of the memory area based on the authentication key and the area 0 key; and
   forming means for forming the memory area starting from the area 0, based on the size of the memory area.

2. The information processing apparatus according to claim 1, wherein the authentication means performs a mutual authentication with a control apparatus for requesting the forming of the memory area by using the authentication key and the area 0 key, the communication means receives the data from the control apparatus, and the forming means decrypts the data received by the communication means by using the encryption key.

3. The information processing apparatus according to claim 1, wherein the identifier of the authentication key is defined by a key version of the authentication key, and the identifier of the encryption key is defined by a key version of the encryption key.

4. The information processing apparatus according to claim 1, wherein the means for storing stores the area 0 key in a general system in response to a reception of the data.

5. The information processing apparatus according to claim 1, wherein the means for storing stores a plurality of authentication keys and a plurality of encryption keys, and the communication means receives a command for obtaining the identifier of the authentication key for a management entity and the identifier of the encryption key for the management entity and transmits the identifier of the authentication key and the identifier of the encryption key in response to the command.

6. The information processing apparatus according to claim 5, wherein the command identifies the management entity.

7. An information processing method for an information processing apparatus, the information processing method comprising:
   transmitting an identifier of an authentication key, an identifier of an encryption key, and an area 0 key;
   receiving, at the information processing apparatus, upon an authentication based on the authentication key and the area 0 key, data encrypted by the encryption key, the data indicating a size of a memory area, the area 0 key stored in an area 0;
   authenticating a forming of the memory area based on the authentication key and the area 0 key; and
   forming the memory area starting from the area 0, based on the size of the memory area.

8. A computer-readable, non-transitory storage medium encoded with a program for enabling a processor to execute a method comprising:
   transmitting an identifier of an authentication key, an identifier of an encryption key, and an area 0 key;
   receiving, upon an authentication based on the authentication key and the area 0 key, data encrypted by the encryption key, the data indicating a size of a memory area, the area 0 key stored in an area 0;
   authenticating a forming of the memory area based on the authentication key and the area 0 key; and
   forming the memory area starting from the area 0, based on the size of the memory area.

9. An information processing apparatus, comprising:
   a storage section configured to store, for a management entity for which a memory area is to be formed, an authentication key and an encryption key;
   a communication section configured to transmit an identifier of the authentication key, an identifier of the encryption key, and an area 0 key, and to receive, upon an authentication based on the authentication key and the area 0 key, data encrypted by the encryption key, the data indicating a size of the memory area, the area 0 key stored in an area 0;
   an authentication section configured to authenticate a forming of the memory area based on the authentication key and the area 0 key; and
   a forming section configured to form the memory area starting from the area 0, based on the size of the memory area.

* * * * *